United States Patent
Hara et al.

(10) Patent No.: US 8,023,222 B2
(45) Date of Patent: Sep. 20, 2011

(54) INFORMATION STORAGE DEVICE AND COMPUTER PRODUCT

(75) Inventors: Takeshi Hara, Kawasaki (JP); Kazuhiko Takaishi, Kawasaki (JP)

(73) Assignee: Toshiba Storage Device Corporation, Tokyo (JP)

( * ) Notice: Subject to any disclaimer, the term of this patent is extended or adjusted under 35 U.S.C. 154(b) by 66 days.

(21) Appl. No.: 12/568,449

(22) Filed: Sep. 28, 2009

(65) Prior Publication Data

US 2010/0128385 A1   May 27, 2010

(30) Foreign Application Priority Data

Nov. 21, 2008   (JP) .................................. 2008-298588

(51) Int. Cl.
*G11B 5/596* (2006.01)
(52) U.S. Cl. .................................................... 360/77.08
(58) Field of Classification Search .................. None
See application file for complete search history.

(56) References Cited

U.S. PATENT DOCUMENTS

| | | | |
|---|---|---|---|
| 6,567,230 B1 * | 5/2003 | Kagami et al. ................... 360/75 |
| 6,574,065 B1 * | 6/2003 | Sri-Jayantha et al. ........... 360/75 |
| 6,774,615 B2 * | 8/2004 | Kosugi et al. ............... 324/76.48 |
| 7,164,261 B2 * | 1/2007 | Hashimoto et al. ......... 324/76.28 |
| 7,268,968 B2 * | 9/2007 | Semba et al. ............... 360/77.02 |
| 7,317,591 B2 * | 1/2008 | Kisaka ........................ 360/77.08 |
| 7,342,737 B2 * | 3/2008 | DeRosa et al. ............. 360/77.08 |
| 7,394,609 B2 * | 7/2008 | Atsumi et al. ................... 360/75 |
| 7,466,101 B2 * | 12/2008 | Takaishi ..................... 360/77.02 |
| 7,561,365 B2 * | 7/2009 | Noguchi et al. ................. 360/75 |
| 7,583,465 B2 * | 9/2009 | Park et al. .................. 360/77.02 |
| 7,679,856 B2 * | 3/2010 | Ishiguro .......................... 360/75 |
| 7,719,787 B2 * | 5/2010 | Harmer ...................... 360/77.02 |
| 2002/0054448 A1 | 5/2002 | Iwashiro |
| 2007/0070540 A1 | 3/2007 | Noguchi et al. |
| 2007/0070542 A1 | 3/2007 | Suzuki et al. |
| 2008/0065240 A1 * | 3/2008 | Takaishi .......................... 700/37 |
| 2010/0268354 A1 * | 10/2010 | Takaishi .......................... 700/37 |

FOREIGN PATENT DOCUMENTS

| | | |
|---|---|---|
| JP | 04-177679 | 6/1992 |
| JP | 06-096538 | 4/1994 |
| JP | 2000-298958 | 10/2000 |
| JP | 2002-93084 | 3/2002 |
| JP | 2007-87558 | 4/2007 |
| JP | 2007-95119 | 4/2007 |

* cited by examiner

*Primary Examiner* — Hoa T Nguyen
*Assistant Examiner* — James L. Habermehl
(74) *Attorney, Agent, or Firm* — Greer, Burns & Crain, Ltd.

(57) ABSTRACT

According to one embodiment, an information storage device includes a recording/reproducing head, a positioning controller, a position detector, a storage module, and a position error detector. The position detector detects the position of the recording/reproducing head. The storage module stores servo control filters. The position error detector generates a new position error signal from a target position and the position of the recording/reproducing head when the positioning controller performs positioning control with control current obtained from a position error signal having passed through each servo control filter. Upon occurrence of a recording/reproducing error, learning to calculate a vibration amount from the position of the recording/reproducing head is sequentially performed for the servo control filters for a predetermined time. The positioning controller performs the positioning control with control current obtained from the position error signal having passed through one of the servo control filters where the vibration amount is smallest.

9 Claims, 12 Drawing Sheets

| SERVO CONTROL FILER | VIBRATION AMOUNT (PREVIOUS) | VIBRATION AMOUNT (CURRENT) |
|---|---|---|
| CANDIDATE 1 | 15 | 25 |
| CANDIDATE 2 | 25 | 15 |
| CANDIDATE 3 | 25 | 30 |
| CANDIDATE 4 | 30 | 35 |
| CANDIDATE 5 | 35 | - |
| CANDIDATE 6 | 35 | - |
| CANDIDATE 7 | 50 | - |

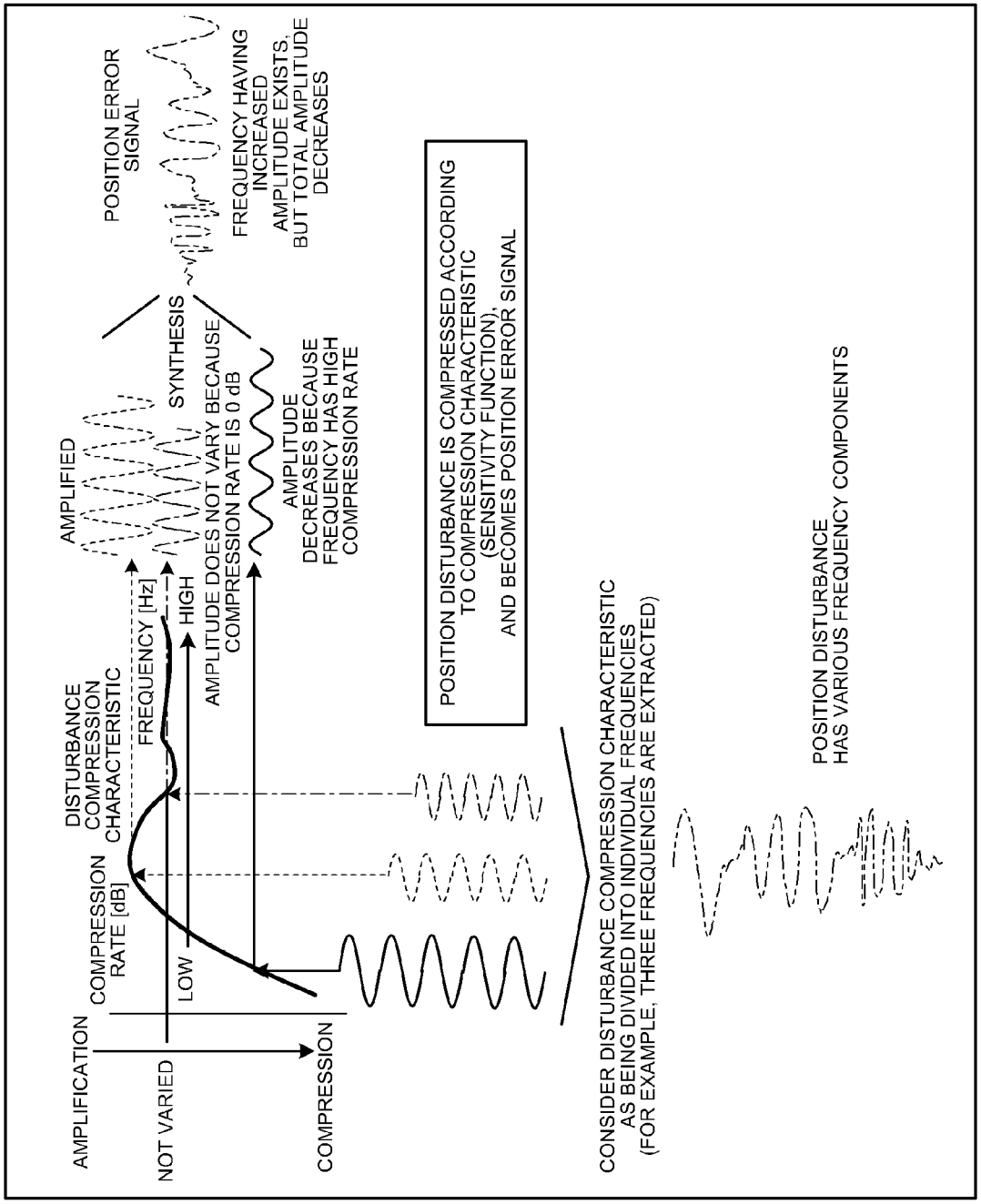

FIG.7

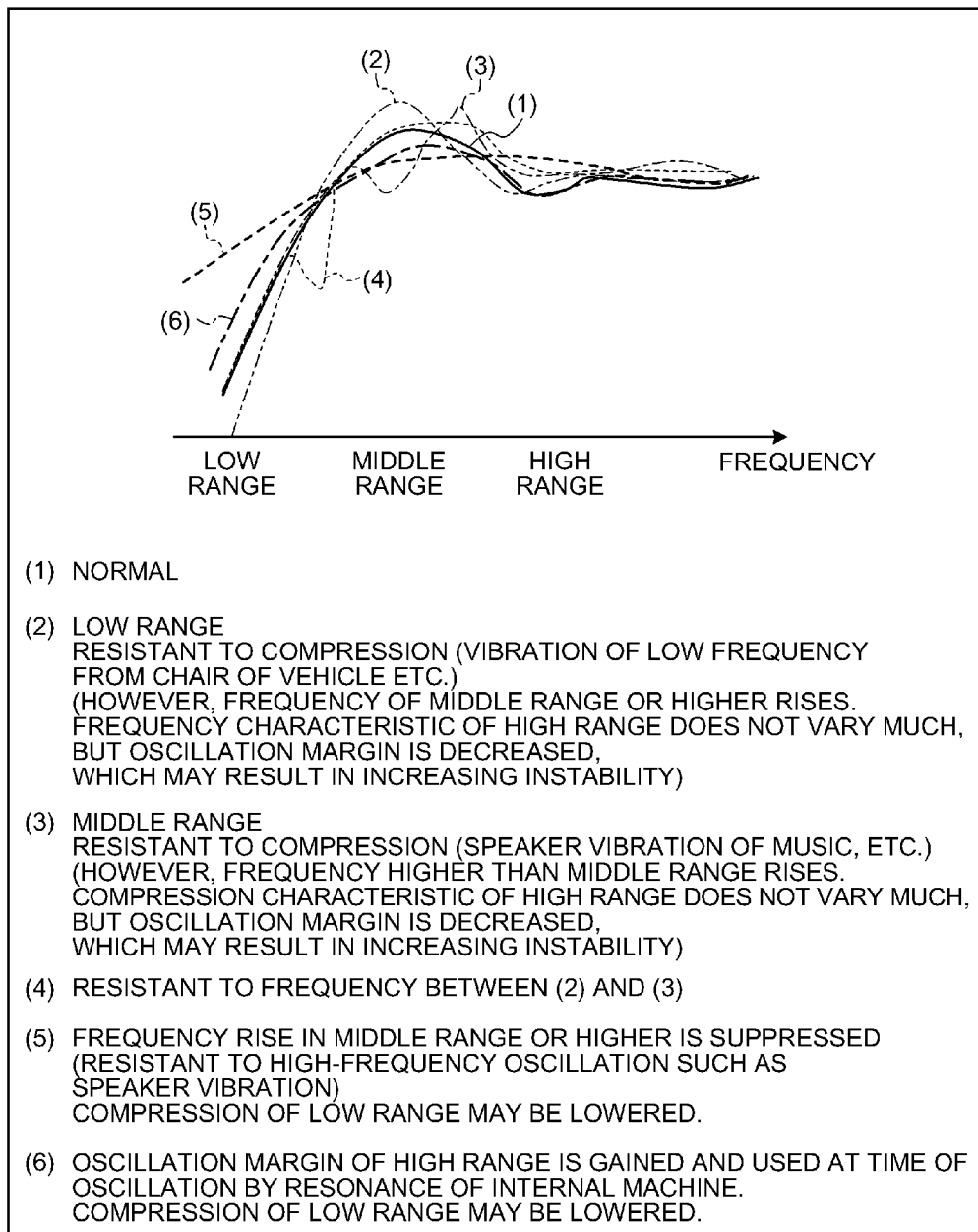

(1) NORMAL (2) LOW RANGE
RESISTANT TO COMPRESSION (VIBRATION OF LOW FREQUENCY
FROM CHAIR OF VEHICLE ETC.)
(HOWEVER, FREQUENCY OF MIDDLE RANGE OR HIGHER RISES.
FREQUENCY CHARACTERISTIC OF HIGH RANGE DOES NOT VARY MUCH,
BUT OSCILLATION MARGIN IS DECREASED,
WHICH MAY RESULT IN INCREASING INSTABILITY)

(3) MIDDLE RANGE
RESISTANT TO COMPRESSION (SPEAKER VIBRATION OF MUSIC, ETC.)
(HOWEVER, FREQUENCY HIGHER THAN MIDDLE RANGE RISES.
COMPRESSION CHARACTERISTIC OF HIGH RANGE DOES NOT VARY MUCH,
BUT OSCILLATION MARGIN IS DECREASED,
WHICH MAY RESULT IN INCREASING INSTABILITY)

(4) RESISTANT TO FREQUENCY BETWEEN (2) AND (3)

(5) FREQUENCY RISE IN MIDDLE RANGE OR HIGHER IS SUPPRESSED
(RESISTANT TO HIGH-FREQUENCY OSCILLATION SUCH AS
SPEAKER VIBRATION)
COMPRESSION OF LOW RANGE MAY BE LOWERED.

(6) OSCILLATION MARGIN OF HIGH RANGE IS GAINED AND USED AT TIME OF
OSCILLATION BY RESONANCE OF INTERNAL MACHINE.
COMPRESSION OF LOW RANGE MAY BE LOWERED.

INFORMATION STORAGE DEVICE AND COMPUTER PRODUCT

CROSS-REFERENCE TO RELATED APPLICATIONS

This application is based upon and claims the benefit of priority from Japanese Patent Application No. 2008-298588, filed Nov. 21, 2008, the entire contents of which are incorporated herein by reference.

BACKGROUND

1. Field

One embodiment of the invention relates to an information storage device and a computer product.

2. Description of the Related Art

To prevent head positioning control performance from being lowered due to influence of vibration applied to an information storage device such as a hard disk device, a technology has been proposed in which positioning control is performed based on a position error signal received from servo information obtained by the head using a servo control filter.

For example, Japanese Laid-open Patent Publication No. 2007-95119 discloses a conventional technology for generating a correction signal. According to the conventional technology, when vibration is detected in a disk device, one or more filters are selected from a plurality of filters prepared in advance to remove frequency signals of different bands.

In the conventional technology, a correction signal is generated using one or more filers selected from a plurality of filters prepared in advance according to the band of vibration detected in a disk device. Therefore, considerable time is required to select filters most suitable for various types of vibrations detected in the disk device. This delays a response to a host side, resulting in degradation of the performance.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

FIG. 6 is an exemplary diagram of disturbance compression characteristics in the embodiment;

FIG. 7 is an exemplary diagram of disturbance compression characteristics for each servo control filter in the embodiment;

DETAILED DESCRIPTION

Figure 1:
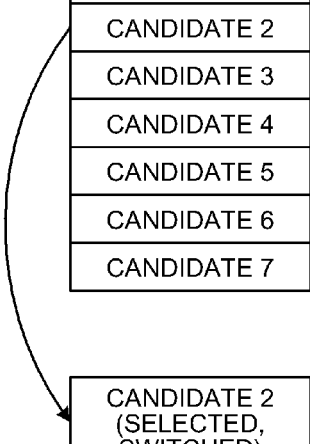
FIG. 1 is an exemplary diagram for explaining a hard disk device according to an embodiment of the invention.

Various embodiments according to the invention will be described hereinafter with reference to the accompanying drawings. In general, according to one embodiment of the invention, an information storage device comprises a recording/reproducing head, a positioning controller, a position detector, a storage module, and a position error detector. The recording-reproducing head is configured to record data on a recording medium and reproduce the data on the recording medium. The positioning controller is configured to position the recording-reproducing head. The position detector is configured to detect a position of the recording-reproducing head based on a servo signal on the recording medium. The storage module is configured to store a plurality of servo control filters. The position error detector is configured to generate a new position error signal from a target position and the position of the recording-reproducing head detected by the position detector when the positioning controller performs positioning control for the recording-reproducing head with control current obtained by causing a position error signal to pass through each of the servo control filters. Learning to calculate a vibration amount is sequentially performed with respect to the servo control filters for a predetermined time. The vibration amount is calculated from the position of the recording-reproducing head detected by the position detector when the positioning controller performs the positioning control for the recording-reproducing head with control current obtained by causing the position error signal to pass through each of the servo control filters upon occurrence of a recording error or a reproducing error. The positioning controller is configured to perform the positioning control for the recording-reproducing head with control current obtained by causing the position error signal to pass through one of the servo control filters where the vibration amount is smallest.

According to another embodiment of the invention, a computer program product embodied on a computer-readable medium and comprising code that, when executed, causing a computer to perform: reading a plurality of servo control filters from a storage module; sequentially performing learning to calculate a vibration amount with respect to the servo control filters for a predetermined time, the vibration amount being calculated from a position of a recording-reproducing head when a positioning controller performs positioning control for the recording-reproducing head with control current obtained by causing a position error signal to pass through each of the servo control filters upon occurrence of a recording error or a reproducing error; and generating a new position error signal from a target position and a position of the recording-reproducing head when the positioning controller performs the positioning control for the recording-reproducing head with control current obtained by causing the position error signal to pass through one of the servo control filters where the vibration amount is smallest.

A hard disk device according to an embodiment of the invention uses servo control filters to remove the influence (noise) of vibration of the device on a position error signal, thereby performing positioning control for a head (generation of a position error signal). When a recording/reproducing error occurs, the hard disk device performs learning sequentially with respect to a plurality of servo control filters for a predetermined time. In the learning, the vibration amount is calculated from the position of a recording/reproducing head when positioning control is performed using a control current obtained by causing a position error signal to pass through the servo control filters. The hard disk device performs positioning control for the recording/reproducing head using a control current obtained by causing the position error signal to pass through a servo control filter where the vibration amount is the smallest.

FIG. 1 is a diagram for explaining the hard disk device of the embodiment. As illustrated in FIG. 1, the hard disk device comprises a plurality of servo control filters (candidates 1 to 7) to be used for positioning control of a head. When an error occurs during a read/write operation performed in response to a request from a host, the hard disk device of the embodiment stores the current vibration amount, and rearranges the servo control filters (candidates 1 to 7) in ascending order of the vibration amount previously measured for each servo control filter.

After rearranging the servo control filters, the hard disk device of the embodiment performs learning acquiring the vibration amount for every servo control filter starting from the servo control filter where the previously measured vibration amount is the smallest and sequentially switching the servo control filters in ascending order of the previously measured vibration amount for a predetermined time limit. For example, as illustrated in FIG. 1, the vibration amounts 25, 15, 30, and 35 when switching the servo control filters of the candidates 1 to 4 are sequentially acquired and stored for every servo control filter.

The hard disk device of the embodiment determines whether the time limit is reached each time the acquisition of the vibration amount is completed. In the case where the time limit is reached when the acquisition of the vibration amount of the candidate 4 is completed, the hard disk device selects the servo control filter corresponding to the smallest vibration amount among the vibration amounts of the individual servo control filters measured within the time limit, and performs switching to the selected servo control filter. For example, as illustrated in FIG. 1, the hard disk device selects the servo control filter of the candidate 2 corresponding to the smallest vibration amount 15 among the vibration amounts of the individual servo control filters measured within the time limit and performs switching to the selected servo control filter.

The hard disk device of the embodiment performs positioning control of the recording/reproducing head using the control current obtained by causing the position error signal to pass through the switched servo control filter, and returns to the read/write operation according to the request from the host.

In this way, the hard disk device of the embodiment enables switching to an optimal servo control filter to suppress the influence of vibration on head positioning control performance within a time limit determined considering the influence on the head positioning control performance.

Figure 2:
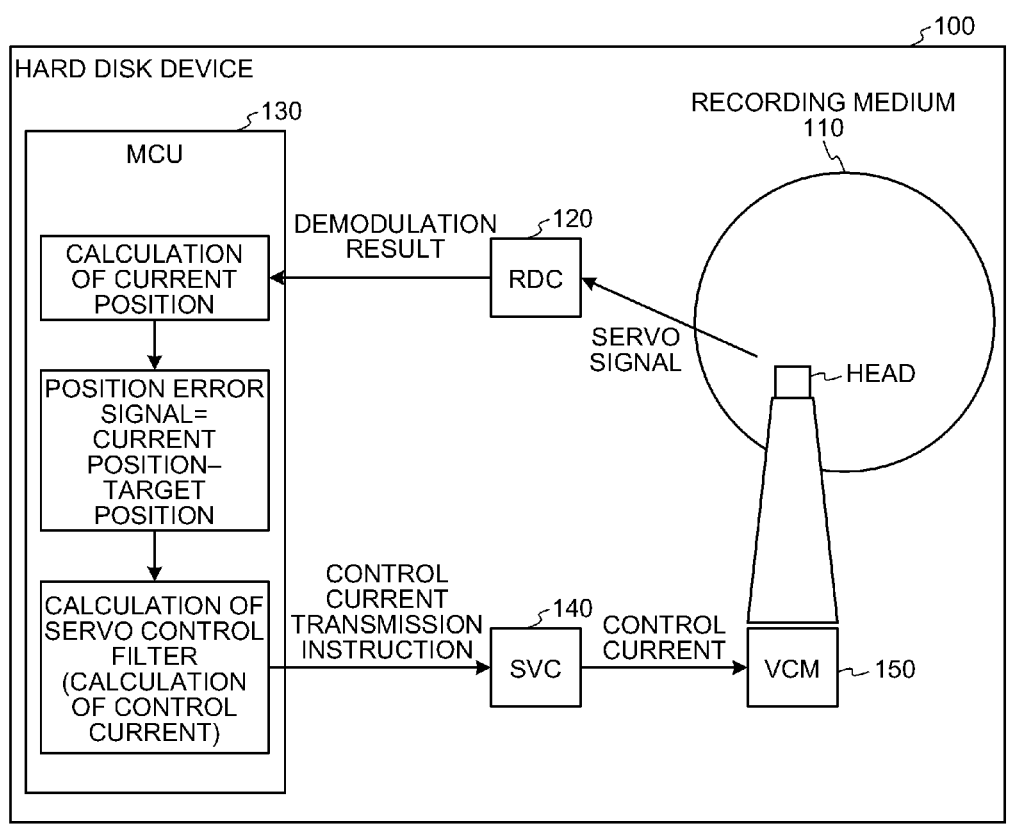
FIG. 2 is an exemplary diagram of a configuration of the hard disk device in the embodiment.

FIG. 2 illustrates an example of a configuration of a hard disk device 100 according to the first embodiment. As illustrated in FIG. 2, the hard disk device 100 comprises a recording medium 110, a read channel controller (RDC) 120, a micro controller unit (MCU) 130, a servo controller (SVC) 140, and a voice coil motor (VCM) 150.

The recording medium 110 records predetermined user data, system data, and the like.

When data is read, the RDC 120 demodulates and decodes an analog signal received from a head (head IC), converts decoded digital data into a parallel signal, and transmits the parallel signal to the MCU 130. When data is written, the RDC 120 encodes and modulates the written data received from a host (not illustrated), and transmits a modulated analog signal to the head (head IC).

The SVC 140 receives a control current transmission instruction from the MCU 130, transmits a control current in response to the control current transmission instruction to the VCM 150, and controls the head position adjusting operation of the VCM 150. The VCM 150 adjusts the position of the head according to the control current received from the SVC 140.

The MCU 130 leads and performs the operation control of the hard disk device 100. When the MCU 130 receives a read/write request from the host (not illustrated), the MCU 130 appropriately switches the filter, and performs seek control (introducing process) for moving the head to a target position.

For example, when the head is distant from the target position, the MCU 130 performs switching to a seek filter for a low frequency band, and maintains a waiting state until the head comes close to the target position. When the head comes close to the target position, the MCU 130 switches from the seek filter to a settling filter to start settling, and maintains a waiting state until the setting is completed. When the settling is completed, the MCU 130 performs switching to the servo control filter for the positioning control of the head and performs servo control.

A flow of the positioning control will be described. As illustrated in FIG. 2, the MCU 130 calculates a current position of the head using a demodulation result received from the RDC 120, and then calculates a position error signal based on a difference between the current position and the target position of the head. In addition, the MCU 130 causes the position error signal to pass through the servo control filter to acquire a control current, and transmits a transmission instruction of the acquired control current to the SVC 140. In a normal case, the MCU 130 repetitively performs the above-described positioning control.

Figures 3, 4:
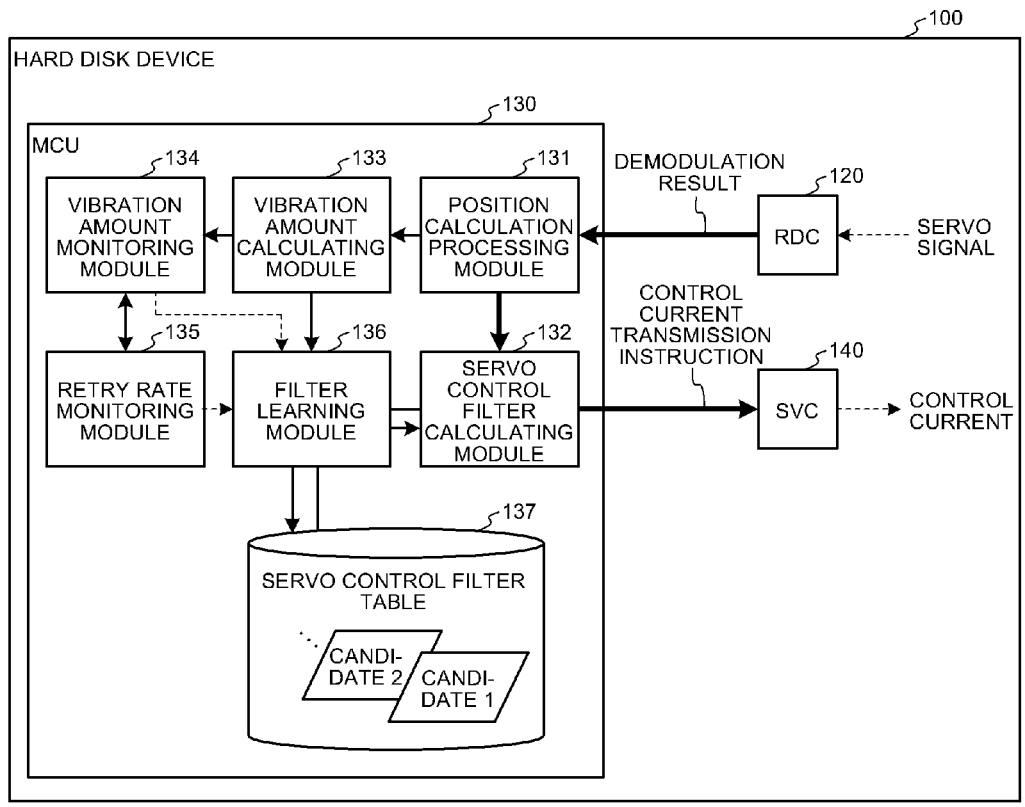
FIG. 3 is an exemplary diagram of a configuration of an MCU in the embodiment.
FIG. 4 is an exemplary diagram of a servo control filter table in the embodiment.

FIG. 3 illustrates an example of a configuration of the MCU 130. As illustrated in FIG. 3, the MCU 130 comprises a position calculation processing module 131, a servo control filter calculating module 132, a vibration amount calculating module 133, a vibration amount monitoring module 134, a retry rate monitoring module 135, a filter learning module 136, and a servo control filter table 137.

The position calculation processing module 131 calculates the current position of the head based on the demodulation result from the RDC 120, and then calculates the position error signal based on the difference between the current position and the target position of the head. In addition, the position calculation processing module 131 transmits the calculated position error signal to the vibration amount calculating module 133 and the servo control filter calculating module 132.

The servo control filter calculating module 132 uses the servo control filter to calculate the control current from the position error signal received from the position calculation processing module 131, and transmits the transmission instruction of the control current to the SVC 140.

The vibration amount calculating module 133 calculates the vibration amount from the position error signal received from the position calculation processing module 131, and transmits the calculated vibration amount to the vibration amount monitoring module 134. For example, as a method for calculating the vibration amount without using a special device such as a shock sensor, a technique of applying an absolute value of the position error signal to a filter such as a low pass filter to extract a noise (see, for example, Japanese Patent Application Publication (KOKAI) No. 2007-87558) is used.

The vibration amount monitoring module 134 monitors the vibration amount from the vibration amount calculating module 133. When the vibration amount monitoring module 134 receives a determination instruction of the vibration amount from the retry rate monitoring module 135, which will be described in detail later, the vibration amount monitoring module 134 determines whether the monitored vibration amount exceeds a predetermined threshold value. When the vibration amount exceeds the predetermined threshold value, the vibration amount monitoring module 134 assumes that a learning trigger is detected and transmits the learning instruction of the servo control filter to the filter learning module 136. On the other hand, when the monitored vibration amount does not exceed the predetermined threshold value, the vibration amount monitoring module 134 transmits the determination result, which indicates that the monitored vibration amount does not exceeds the predetermined threshold value, to the retry rate monitoring module 135.

When the read/write operation, which is performed according to the request from the host (not illustrated), is not completed successfully, the retry rate monitoring module 135 monitors the retry process rate, and determines whether the retry is over. When the retry is over, the retry rate monitoring module 135 outputs an error report to the host that is a request origin of the read/write operation. On the other hand, when the retry is not over, the retry rate monitoring module 135 transmits the determination instruction of the vibration amount to the vibration amount monitoring module 134.

When the retry rate monitoring module 135 receives from the vibration amount monitoring module 134 the determination result indicating that the vibration amount does not exceed the predetermined threshold value after transmitting the determination instruction of the vibration amount, the retry rate monitoring module 135 determines whether the retry rate exceeds a predetermined threshold value (for example, retry generation rate within a predetermined time). When the retry generation rate exceeds the predetermined threshold value, the retry rate monitoring module 135 transmits the learning instruction of the servo control filter to the filter learning module 136. On the other hand, when the retry rate does not exceed the predetermined threshold value, the MCU 130 performs the retry of the read/write operation.

FIG. 4 illustrates an example of the servo control filter table 137. The servo control filter table 137 stores learning content learned by the filter learning module 136, which will be described in detail later. For example, as illustrated in FIG. 4, the servo control filter table 137 stores learning content where the candidates (functions of different multipliers of the candidates 1 to 7) of the servo control filters to be employed for removing influence (noise) on the position error signal by the vibration of the device and information of the vibration amounts measured for every servo control filter are associated with each other.

When the filter learning module 136 receives the learning instruction of the servo control filter from the vibration amount monitoring amount 134 or the retry rate monitoring module 135, the filter learning module 136 starts learning of the servo control filter. Specifically, when the filter learning module 136 receives the learning instruction of the servo control filter, the filter learning module 136 starts a timer to measure a learning time, and stores a current vibration amount (vibration amount of the servo control filter at a current point of time).

Next, the filter learning module 136 rearranges the candidates of the servo control filters in ascending of the previously measured vibration amount stored in the servo control filter table 137, and performs switching to the servo control filter where the vibration amount is the smallest. The filter learning module 136 maintains a waiting state until the switched servo control filter is stabilized, acquires the vibration amount, associates the acquired vibration amount with the servo control filter, and stores the association result in the servo control filter table 137.

For example, as illustrated in FIG. 4, if the filter learning module 136 rearranges the candidates of the servo control filters in ascending order of the previously measured vibration amount, the servo control filters are rearranged to the order of the candidates 1 to 7. In addition, the filter learning module 136 performs switching to the servo control filter of the candidate 1 where the vibration amount is the smallest, maintains awaiting state until the servo control filter of the candidate 1 is stabilized, acquires the vibration amount 25, stores the acquired vibration amount in association with the candidate 1 in the servo control filter table 137.

In addition, the filter learning module 136 determines whether the time limit is reached each time the acquisition of the vibration amount is completed. For example, the filter learning module 136 acquires the vibration amount when the filter is switched to the servo control filter of the candidate 1, and stores the vibration amount in the servo control filter table 137. Then, the filter learning module 136 determines whether the time limit is reached (whether time is over). When the time limit is not reached, the filter learning module 136 performs switching to the servo control filter of the candidate 2 whose vibration amount is the second smallest. Similarly to the case of the candidate 1, the filter learning module 136 maintains a waiting state until the servo control filter of the candidate 2 is stabilized, acquires the vibration amount, stores the acquired vibration amount in association with the candidate 2 in the servo control filter table 137. The filter learning module 136 sequentially switches the servo control filters in ascending order of the previously measured vibration amount until the timer reaches the time limit, and repetitively performs acquisition and storage of the vibration amounts.

When the timer reaches the time limit, the filter learning module 136 selects the servo control filter corresponding to the smallest vibration amount among the vibration amounts of the individual servo control filters measured within the time limit, and performs switching to the selected servo control filter. For example, as illustrated in FIG. 4, the filter learning module 136 selects the servo control filter of the candidate 2 corresponding to the smallest vibration amount 15 among the vibration amounts 25, 15, 30, and 35 measured within the time limit, and performs switching to the selected servo control filter of the candidate 2. In addition, the filter learning module 136 completes learning of the servo control filter. When the learning by the filter learning module 136 is completed, the MCU 130 returns to the read/write operation.

The filter learning module 136 sets the vibration amount corresponding to the newly switched servo control filter as a threshold value used to detect a learning trigger.

When a predetermined condition is satisfied in the learning of the servo control filter, the filter learning module 136 resets the learning content stored in the servo control filter table 137. Specifically, when the filter learning module 136 receives the learning instruction of the servo control filters, the filter learning module 136 starts the timer to measure the learning time and stores the current vibration amount (vibration amount of the servo control filter at a current point of time).

Next, the filter learning module 136 calculates a value that is obtained by subtracting from the current vibration amount (vibration amount of the currently used servo control filter) the previous vibration amount (previously acquired vibration amount of the same servo control filter), and determines whether the calculated difference of the vibration amounts exceeds a predetermined reset threshold value, which is to detect whether the property of the vibration is greatly varied.

When the calculated difference of the vibration amounts exceeds the predetermined reset threshold value, the filter learning module 136 resets the learning content stored in the servo control filter table 137 with respect to the non-used servo control filters. Specifically, the filter learning module 136 deletes information of the vibration amounts stored in the servo control filter table 137, and rearranges the candidates of the servo control filters in a default state.

After resetting the servo control filter table 137, the filter learning module 136 performs the same operation as the case of the above-described normal learning. That is, the filter learning module 136 sequentially switches the servo control filters of the candidates arranged in the servo control filter table 137 in descending order until the timer reaches the time limit, and repetitively performs acquisition and storage of the vibration amounts of the switched servo control filters.

Figure 5:
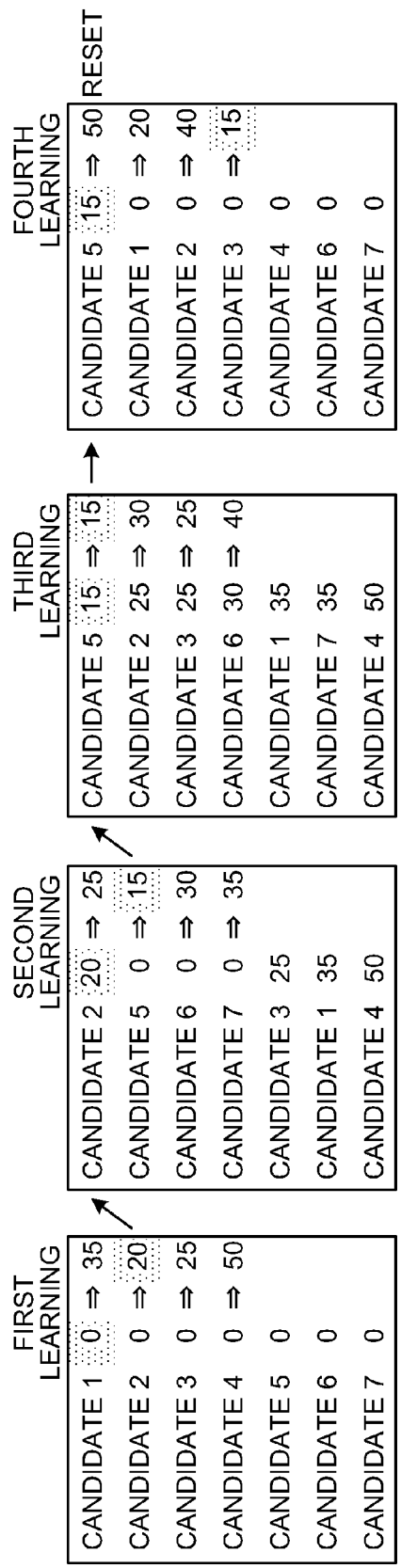
FIG. 5 is an exemplary diagram for explaining a transition of the servo control filter table in the embodiment.

A transition of learning content in the servo control filter table 137 will be described with reference to FIG. 5. FIG. 5 is a diagram for explaining a transition of the servo control filter table 137. As a result of the first learning by the filter learning module 136, the learning content stored in the servo control filter table 137 is updated.

As illustrated in FIG. 5, at the beginning of the first learning, the candidates of the servo control filters that are stored in the servo control filter table 137 are arranged in a default state of the candidates, i.e., 1→2→3→4→5→6→7, and the information of previously measured vibration amounts is not stored. When the first learning is completed, the information of the vibration amounts of 35, 20, 25, and 50 is stored in association with the servo control filters of the candidates 1 to 4, respectively. When the first learning is completed, the filter is switched from the servo control filter used before the first learning starts to the servo control filter of the candidate 2 where the vibration amount is the smallest.

As illustrated in FIG. 5, as a result of the second learning by the filter learning module 136, the learning content in the servo control filter table 137 are updated. The candidates of the servo control filters are rearranged in ascending order of the previously measured vibration amount stored in the servo control filter table 137, i.e., in the order of the candidates 2→5→6→7→3→1→4. When the second learning is completed, the information of the vibration amounts of 25, 15, 30, and 35 overwrites the existing information or is stored in association with the servo control filters of the candidates 2, 5, 6, and 7, respectively. When the second learning is completed, the servo control filter is switched from the servo control filter of the candidate 2 used at the beginning of the second learning to the servo control filter of the candidate 5 where the vibration amount is the smallest.

As illustrated in FIG. 5, as a result of the third learning by the filter learning module 136, the learning content stored in the servo control filter table 137 is updated. The candidates of the servo control filters are rearranged in ascending order of the previously measured vibration amount stored in the servo control filter table 137, i.e., in the order of the candidates 5→2→3→6→1→7→4. When the third learning is completed, the information of the vibration amounts of 15, 30, 25, and 40 overwrites the existing information and is stored in association with the servo control filters of the candidates 5, 2, 3, and 6, respectively. When the third learning is completed, since the servo control filter of the candidate 5 used at the beginning of the third learning still has the smallest vibration amount in the third learning, the servo control filter continues to be used.

As illustrated in FIG. 5, as a result of the fourth learning by the filter learning module 136, the learning content stored in the servo control filter table 137 is reset. Specifically, when the value 35 obtained by subtracting the previous vibration amount 15 of the servo control filter of the candidate 5 from the current vibration amount 50 of the candidate 5 exceeds the reset threshold value (for example, 30), the learning content of the servo control filters other than the candidate 5 is reset by the filter learning module 136.

That is, as illustrated in FIG. 5, a record with respect to the candidate 5 remains without being deleted, and the information of the vibration amounts that are stored with respect to the candidates 1 to 4, 6, and 7 is deleted. As a result, the servo control filters are rearranged in a default state, i.e., in the order of the candidates 1→2→3→4→6→7. When the fourth learning is completed, information of the vibration amounts of 50, 20, 40, and 15 is newly stored in association with the servo control filters of the candidates 5, 1, 2, and 3, respectively. When the fourth learning is completed, the servo control filter is switched from the servo control filter of the candidate 5 used at the beginning of the fourth learning to the servo control filter of the candidate 3 where the vibration amount is the smallest.

Next, a disturbance compression characteristic of the hard disk device 100 will be described. The hard disk device 100 has a disturbance compression characteristic as illustrated in FIG. 6 when positioning control is being performed among the RDC 120, the position calculation processing module 131, the SVC 140, and the VCM 150. In addition, if characteristics of the servo control filter calculating module 132 and the machine (for example, the VCM 150) are referred to as a "characteristic C (servo control filter characteristic)" and a "characteristic P (mechanical characteristic)", the disturbance compression characteristic is expressed as 1/(1+CP) (however, an electric characteristic is not considered, for the simplification of description).

As described above, the hard disk device 100 selects the servo control filter where the vibration amount is the smallest from a plurality of servo control filters to be switched previously prepared, and performs switching to the selected servo control filter. That is, since the "characteristic P (mechanical characteristic)" cannot be changed, the servo control filter where the characteristic can be changed is switched to adjust the disturbance compression characteristic to become optimal. For example, as illustrated in (1) to (6) of FIG. 7, the disturbance compression characteristic of the hard disk device 100 may be adjusted according to disturbances due to various factors.

Figure 8:
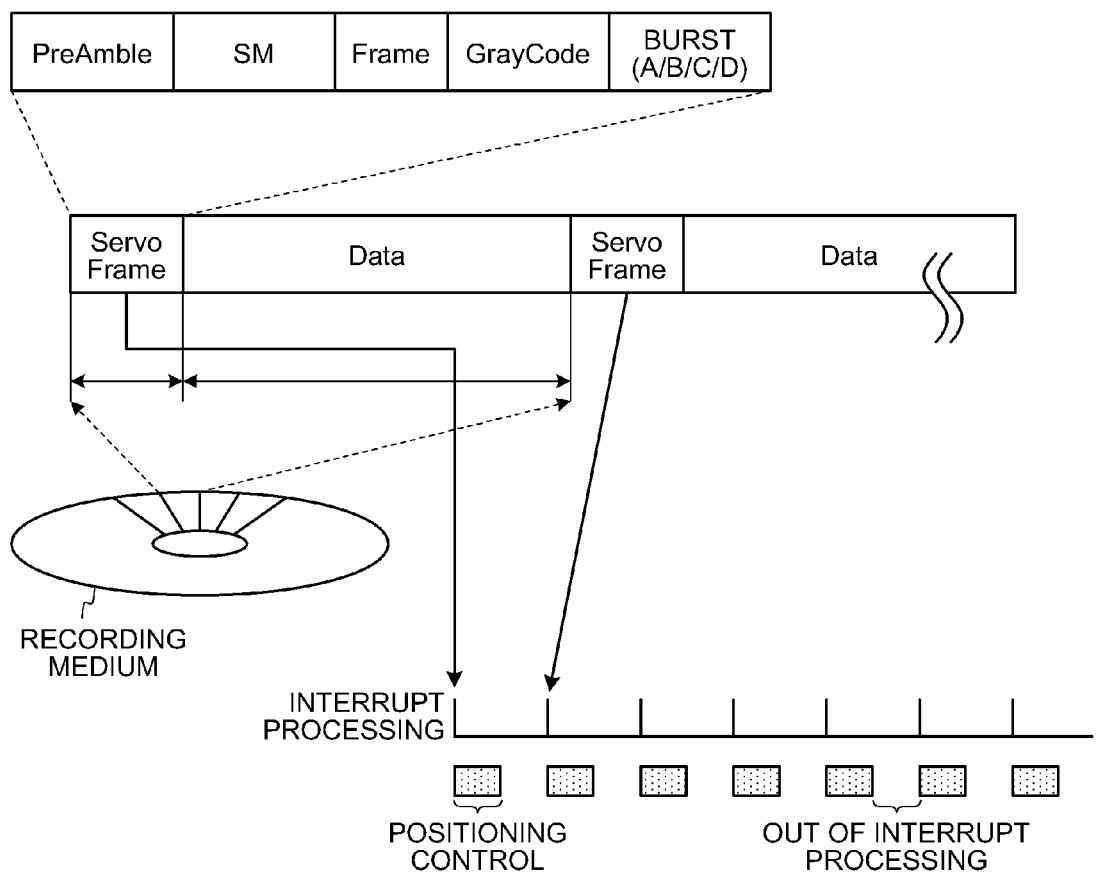
FIG. 8 is a exemplary schematic diagram for explaining an interrupt process in the embodiment.

The learning process by the filter learning module 136 can be performed at two timings described below. For example, the learning process is performed in or out of introducing process (see FIG. 8) regularly performed in a common control loop (loop of positioning control repetitively performed among the RDC 120, the position calculation processing module 131, the SVC 140, and the VCM 150 as indicated by dotted line of FIG. 3). FIG. 6 illustrates an example of disturbance compression characteristics. FIG. 7 illustrates an example of disturbance compression characteristics for every servo control filter. FIG. 8 is a schematic diagram for explaining an interrupt process.

The head illustrated in FIG. 3 is a recording/reproducing head. The servo control filter calculating module 132 and the SVC 140 functions as a positioning controller. The position calculation processing module 131 and the RDC 120 functions as a position detector. The servo control filter table 137 functions as a storage module. The position calculation processing module 131 functions as a position error detector.

Figure 9:
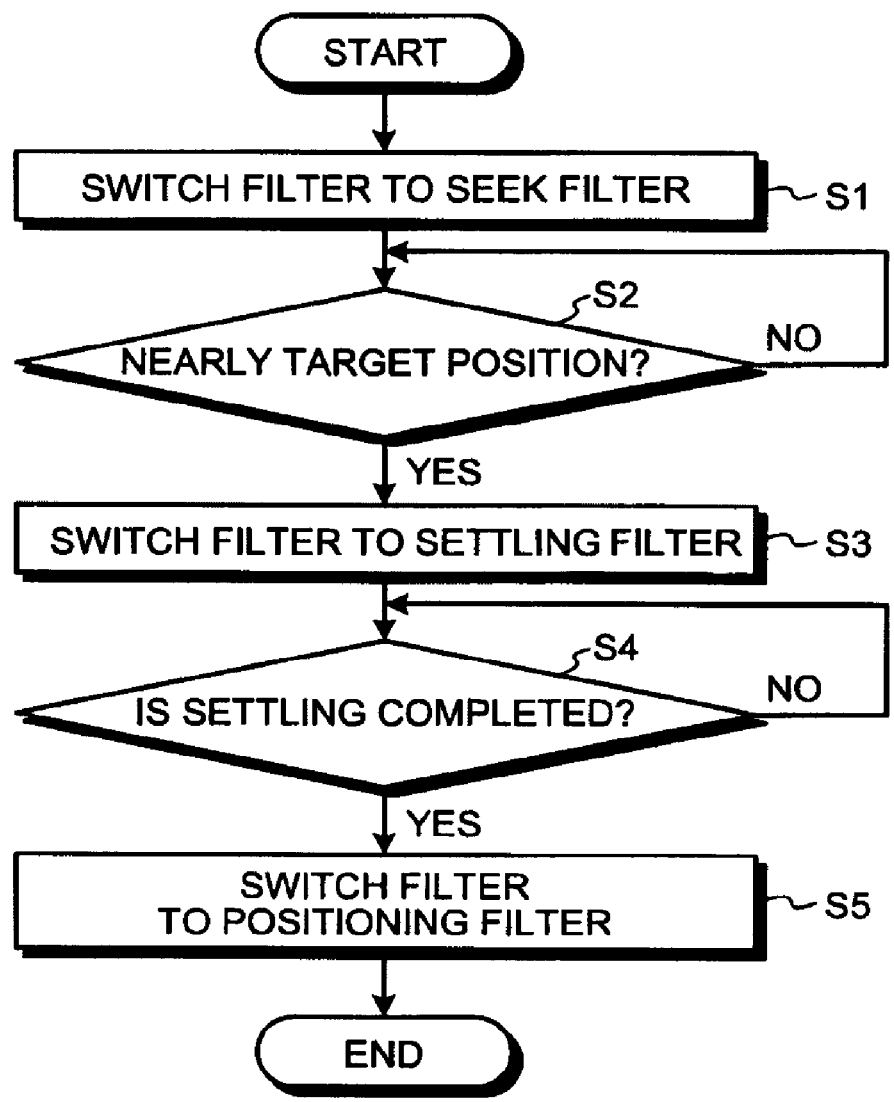
FIG. 9 is an exemplary flowchart of an introducing process in the embodiment.

The operation of the hard disk device 100 will be described. FIG. 9 is a flowchart of an introducing process according to the embodiment. When the MCU 130 receives the read/write request from the host, the MCU 130 appropriately switches the filters, and performs seek control (introducing process) for moving the head to the target position.

Specifically, as illustrated in FIG. 9, the MCU 130 uses the current position of the head calculated by the position calculation processing module 131 to switch to a seek filter for a low frequency band when the head is distant from the target position (S1). Next, the MCU 130 maintains a waiting state until the head comes close to the target position (S2).

When the head comes close to the target position (YES at S2), the MCU 130 switches from the seek filter to the settling filter (S3), starts settling, and maintains until the settling is completed (S4). When the settling is completed (YES at S4), the MCU 130 switches the servo control filter to the one for the positioning control of the head (S5), and performs servo control.

Figure 10:
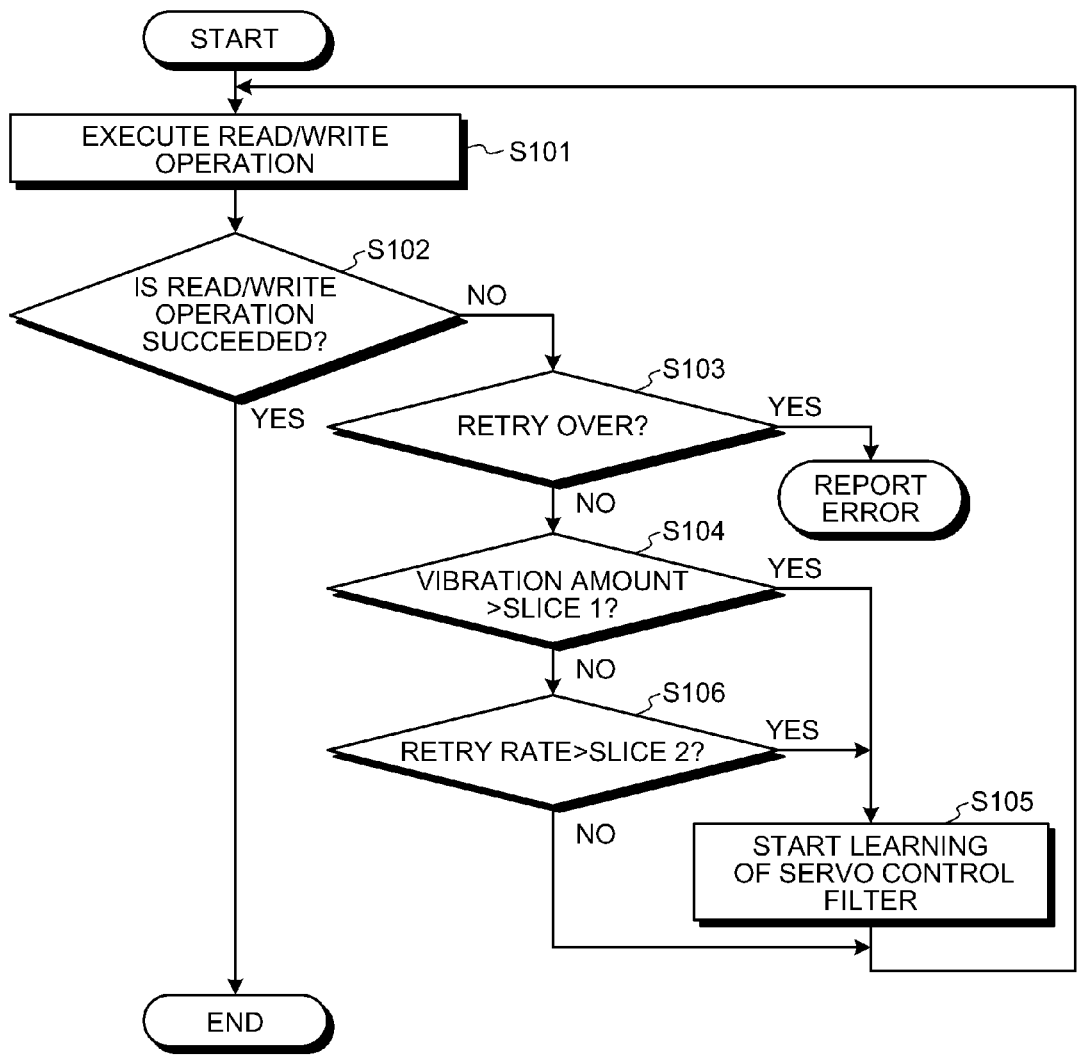
FIG. 10 is an exemplary flowchart of learning trigger detection in the embodiment.

FIG. 10 is a flowchart of learning trigger detection according to the embodiment. The MCU 130 monitors whether the read/write operation performed in response to the request from the host is successfully completed after the seek control is completed, and performs detection of the learning trigger of the filter learning module 136, which will be described in detail later, according to the monitor result.

Specifically, as illustrated in FIG. 10, the MCU 130 performs read/write operation in response to the request from the host (S101), and monitors whether the read/write operation is successfully performed (S102). When the read/write operation is successfully performed as a result of monitoring (YES at S102), the MCU 130 terminates the process. On the other hand, when the read/write operation is not successfully performed (NO at S102), the retry rate monitoring module 135 of the MCU 130 determines whether the retry of the read/write operation is possible (whether the retry is over) (S103).

When the retry is over (YES at S103), the retry rate monitoring module 135 outputs an error report to the host that has requested the read/write operation. In contrast, when the retry is not over (NO at S103), the retry rate monitoring module 135 transmits a determination instruction of the vibration amount to the vibration amount monitoring module 134.

The vibration amount monitoring module 134 monitors the vibration amount from the vibration amount calculating module 133. When the vibration amount monitoring module 134 receives a determination instruction of the vibration amount from the retry rate monitoring module 135, the vibration amount monitoring module 134 determines whether the monitored vibration amount exceeds a predetermined threshold value (slice 1) (S104). When the monitored vibration amount exceeds the predetermined threshold value (YES at S104), the vibration amount monitoring module 134 assumes that a learning trigger is detected and transmits the learning instruction of the servo control filter to the filter learning module 136. The filter learning module 136 starts learning of the servo control filter (S105).

On the other hand, when the monitored vibration amount does not exceed the predetermined threshold value (slice 1) (NO at S104), the vibration amount monitoring module 134 transmits the determination result, which indicates that the monitored vibration amount does not exceeds the predetermined threshold value, to the retry rate monitoring module 135.

When the retry rate monitoring module 135 receives from the vibration amount monitoring module 134 the determination result indicating that the vibration amount does not exceed the predetermined threshold value, the retry rate monitoring module 135 determines whether the retry rate exceeds the predetermined threshold value (slice 2) (S106). When the retry rate exceeds the predetermined threshold value (slice 2) (YES at S106), the retry rate monitoring module 135 transmits the learning instruction of the servo control filter to the filter learning module 136. The filter learning module 136 starts learning of the servo control filter (S105).

On the other hand, when the retry rate does not exceed the predetermined threshold value (NO at S106), the MCU 130 performs the retry of the read/write operation.

Figure 11:
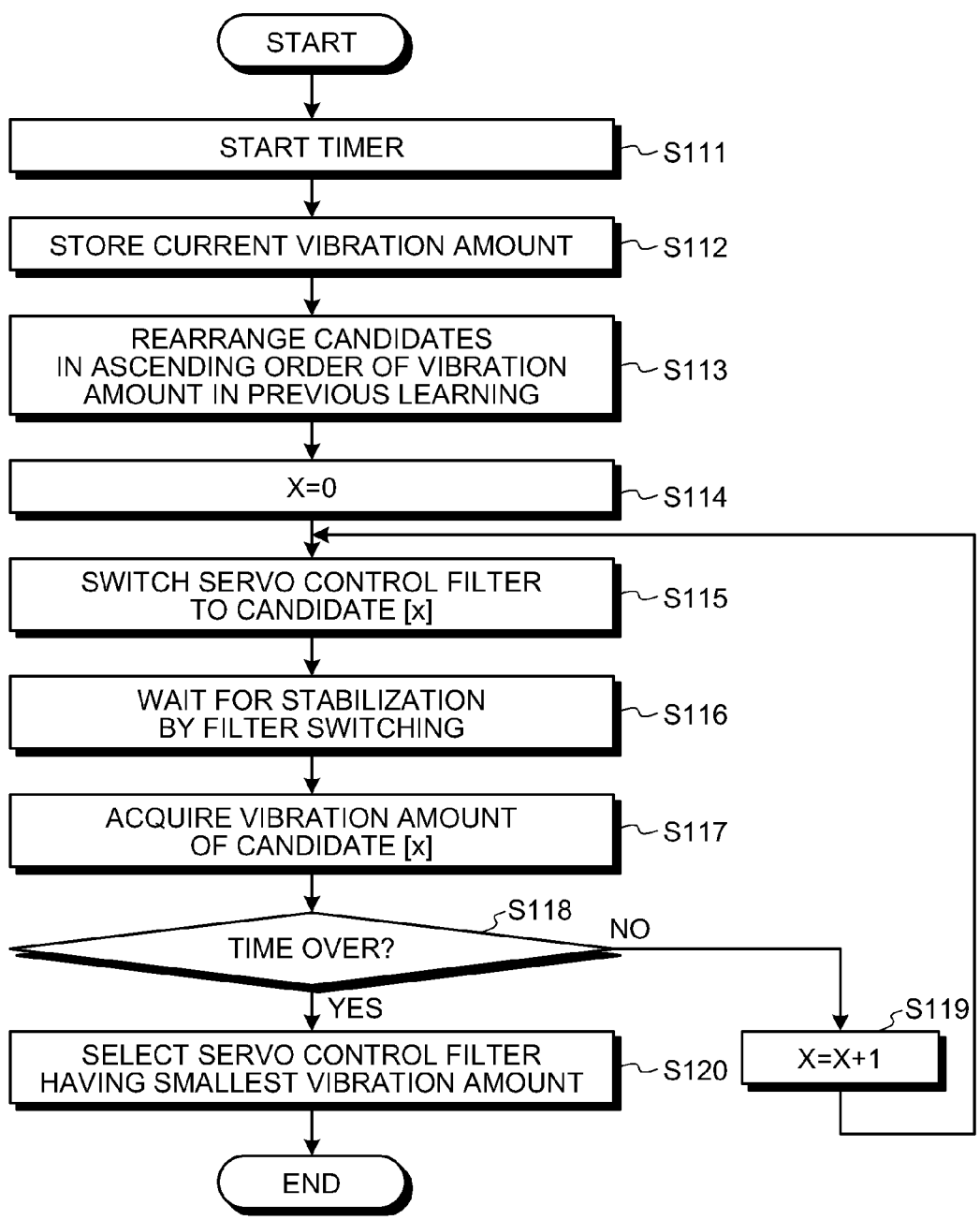
FIG. 11 is an exemplary flowchart of a learning process of the servo control filter in the embodiment.

FIG. 11 is a flowchart of a learning process of the servo control filter according to the embodiment. When the filter learning module 136 receives the learning instruction of the servo control filter from the vibration amount monitoring module 134 or the retry rate monitoring module 135, the filter learning module 136 performs learning of the servo control filter.

Specifically, as illustrated in FIG. 11, when the filter learning module 136 receives the learning instruction of the servo control filter, the filter learning module 136 starts the timer to measure the time elapsed after the filter learning starts (S111). In addition, the filter learning module 136 stores the current vibration amount (vibration amount of the servo control filter at a current point of time) (S112).

Next, the filter learning module 136 rearranges the candidates of the servo control filters in ascending order of the previously measured vibration amount stored in the servo control filter table 137 (S113). Next, the filter learning module 136 sets a variable X, which is updated when the servo control filter is switched, to 0 (S114), and selects the servo control filter where the vibration amount is the smallest from the servo control filter table 137 and switches the filter to the selected servo control filter (S115). The filter learning module 136 maintains awaiting state until the switched servo control filter is stabilized (S116), acquires the vibration amount (S117), stores the acquired vibration amount in association with the servo control filter in the servo control filter table 137.

After the vibration amount is acquired, the filter learning module 136 determines whether the time elapsed after the filter learning starts reaches the time limit within which the filter learning process needs to be completed (S118). That is, the filter learning module 136 acquires the vibration amount after the servo control filter is switched and stores the vibration amount in the servo control filter table 137. Then, the filter learning module 136 determines whether the timer started with the start of the learning reaches the time limit (whether time is over).

When the time elapsed after the filter learning starts does not reach the time limit within which the filter learning process needs to be completed (when time is not over) (NO at S118), the filter learning module 136 increments the variable X by 1 (S119), and repeats the process from S115 to S117. That is, the filter learning module 136 switches the servo control filters in ascending order of the previously measured vibration amount until the timer reaches the time limit, and repetitively performs acquisition and storage of the vibration amounts.

When the time elapsed after the filter learning starts reaches the time limit within which the filter learning process needs to be completed (when time is over) (YES at S118), the filter learning module 136 selects the servo control filter corresponding to the smallest vibration amount among the vibration amounts of the individual servo control filters measured within the time limit (S120). In addition, the filter learning module 136 performs switching to the selected servo control filter. For example, as illustrated in FIG. 4, the filter learning module 136 selects the servo control filter of the candidate 2 corresponding to the smallest vibration amount 15 among the vibration amounts 25, 15, 30, and 35 measured within the time limit, and performs switching to the selected servo control filter. In addition, when the learning by the filter learning module 136 is completed, the MCU 130 returns to the read/write operation.

Figure 12:
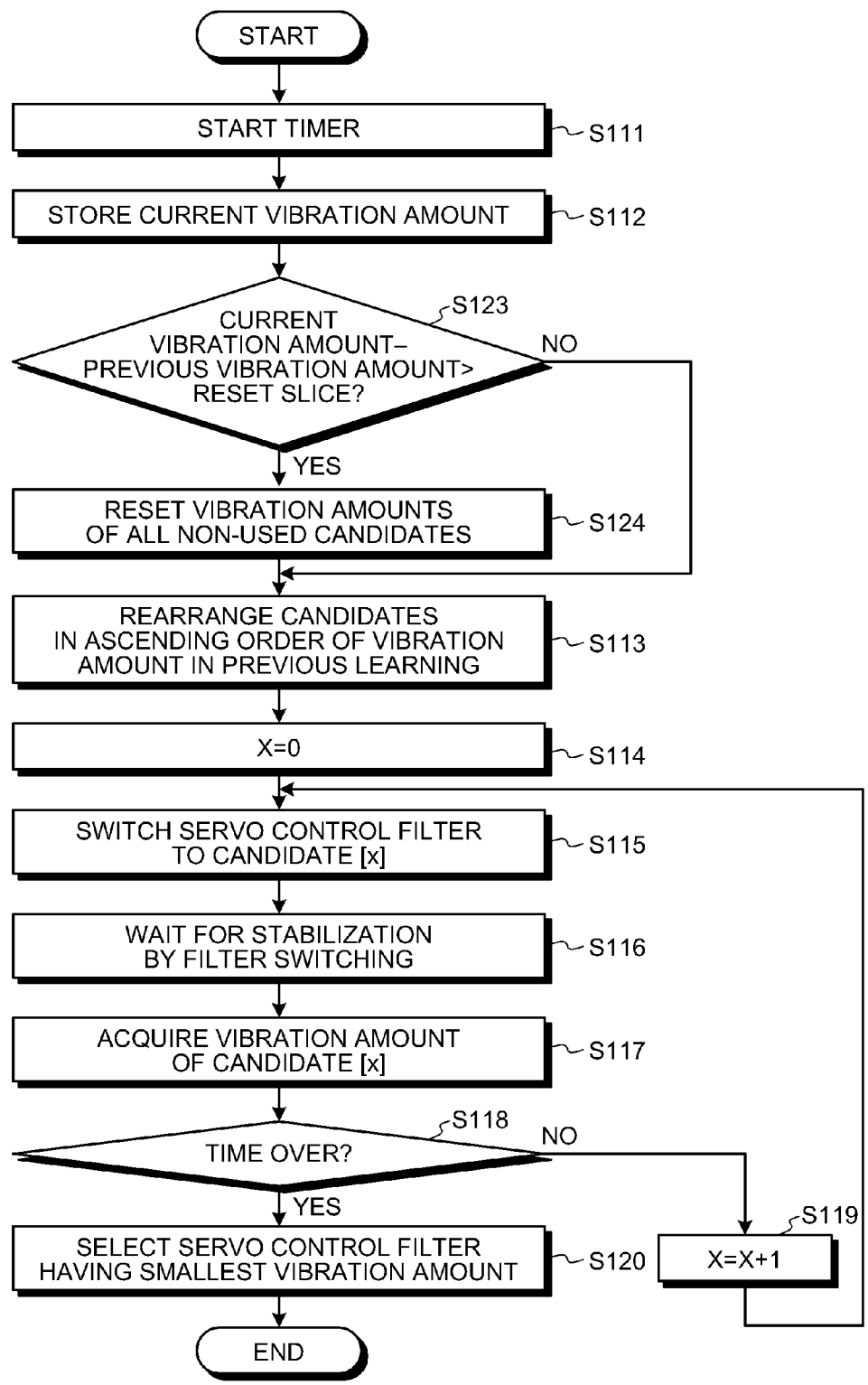
FIG. 12 is an exemplary flowchart of a learning process including a reset of learning content in the embodiment.

FIG. 12 is a flowchart of a learning process including a reset of learning content according to the embodiment. When the predetermined condition is satisfied in the learning of the servo control filter, the filter learning module 136 resets the learning content stored in the servo control filter table 137. The flow of the process illustrated in FIG. 12 is basically the same as that illustrated in FIG. 11, except for S123 and S124.

That is, as illustrated in FIG. 12, when the filter learning module 136 receives the learning instruction of the servo control filter, the filter learning module 136 starts the timer to measure the learning time (S111) and stores the current vibration amount (vibration amount of the servo control filter at a current point of time) (S112), similarly to S111 and S112 in FIG. 11.

Next, the filter learning module 136 calculates a value that is obtained by subtracting from the current vibration amount (vibration amount of the currently used servo control filter) the previous vibration amount (previously acquired vibration amount of the same servo control filter), and determines whether the calculated difference of the vibration amounts exceeds the predetermined reset threshold value (S123).

When the calculated difference of the vibration amounts exceeds the predetermined reset threshold value (YES at S123), the filter learning module 136 resets the learning content stored in the servo control filter table 137 with respect to the non-used servo control filters (S124). Specifically, the filter learning module 136 deletes information of the vibration amounts stored in the servo control filter table 137, and rearranges the candidates of the servo control filters in a default state.

After resetting the learning content stored in the servo control filter table 137, the filter learning module 136 performs the process S113 and that subsequent thereto in FIG. 11. On the other hand, when the calculated difference of the vibration amounts does not exceed the predetermined reset threshold value (NO at S123), the filter learning module 136 performs the process S113 and that subsequent thereto in FIG. 11. That is, the filter learning module 136 sequentially selects the servo control filters of the candidates arranged in the servo control filter table 137 in descending order until the timer reaches the time limit (until the time elapsed after the filter learning starts reaches the time limit within which the filter learning process needs to be completed). In addition, the filter learning module 136 repetitively performs acquisition and storage of the vibration amounts of the switched servo control filters.

As described above, according to the embodiment, when recording/reproducing error occurs, learning of calculating the vibration amount is performed. The vibration amount is calculated from the position of the recording/reproducing head when positioning control is performed using a control current obtained by causing a position error signal to pass through each servo control filter. The learning is sequentially performed with respect to each of a plurality of servo control filters for a predetermined time, and positioning control of the recording/reproducing head is performed using a control current obtained by causing the position error signal to pass through a servo control filter where the measured vibration amount is the smallest. In this manner, a filter can be switched to an optimal servo control filter to suppress an influence of vibration on head positioning control performance within a time limit considering the influence on the performance to prevent delay of a response to the host side (i.e., a filter can be switched to a servo control filter having disturbance compression characteristics corresponding to various disturbances).

According to the embodiment, when a learning trigger satisfying a predetermined condition is generated, the learning of the servo control filters is performed. Therefore, time is required until the positioning control of the head is completed. Thus, adverse effect on the head positioning control performance can be minimized.

According to the embodiment, the learning is performed selectively and sequentially for the servo control filters in ascending order of the vibration amount. Thus, a filter can be efficiently switched to an optimal servo control filter to suppress the influence of vibration on the head positioning control performance.

According to the embodiment, when the difference between of the current vibration amount and the previous vibration amount exceeds a threshold value, learning content is reset. Accordingly, a filter can be switched to an optimal servo control filter taking into account variation in vibration property.

While a specific embodiment has been described, other embodiments or modifications are also possible. In the following, such modifications will be described.

The constituent elements of the MCU 130 of the hard disk device 10 illustrated in FIG. 3 are functionally conceptual, and need not be physically configured as illustrated. In other words, the specific mode of dispersion and integration of the constituent elements is not limited to the ones illustrated in FIG. 3. For example, the vibration amount monitoring module 134, the retry rate monitoring module 135, and the filter learning module 136 may be integrated. In this manner, the constituent elements of the MCU 130, as a whole or in part, can be divided or integrated in arbitrary units either functionally or physically based on various types of loads or use conditions. All or any part of the processing functions (see FIGS. 9 to 12) performed by the hard disk device 100 (in particular, the MCU 130) may be realized by a central processing unit (CPU) and a program analyzed and executed by the CPU, or may be realized as hardware by wired logic.

Figure 13:
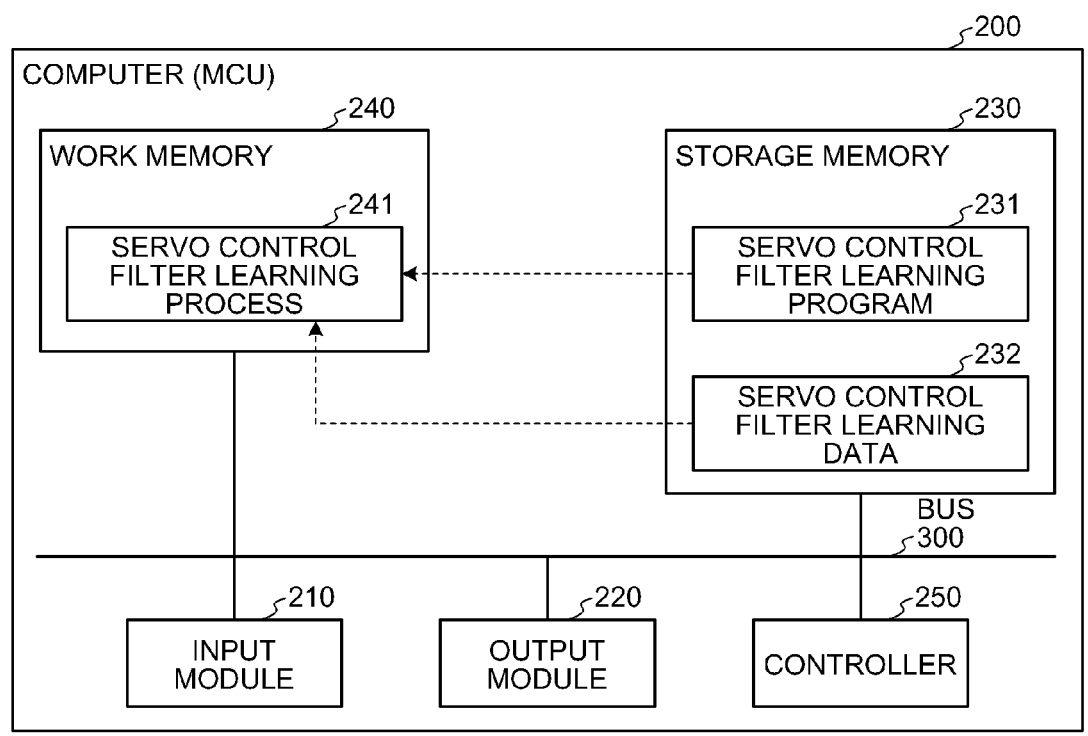
FIG. 13 is an exemplary diagram of a computer that executes a servo control filter learning program in the embodiment.

The various processes (for example, see FIGS. 8 to 11) of the hard disk device 100 described in the embodiment may be implemented by executing a program prepared in advance by a microprocessor, such as the MCU or the MPU. In the following, an example of a computer that executes a program (hereinafter, "servo control filter learning program") that realizes the same function as described in the embodiment will be described with reference to FIG. 13. FIG. 13 is a block diagram of a computer 200 that executes the servo control filter learning program.

As illustrated in FIG. 13, the computer 200 comprises as MCU an input module 210, an output module 220, a storage memory 230, a work memory 240, and a controller 250, which are connected to one another by a bus 300.

The input module 210 receives various data input from a user. The output module 220 displays a variety of information. The storage memory 230 stores information that is needed to perform various processes by the controller 250.

The work memory 240 temporarily stores a variety of information. The controller 250 performs various operation processes.

As illustrated in FIG. 13, the storage memory 230 stores in advance servo control filter learning data 232 and a servo control filter learning program 231 implementing the same function as the constituent elements of the MCU 130 of the hard disk device 100 described above in the embodiment. The servo control filter learning program 231 may be appropriately distributed and stored in a storage module of another computer that is connected to enable communication through a network.

The controller 250 loads the servo control filter learning program 231 from the storage memory 230 into the work memory 240. Thus, as illustrated in FIG. 13, the servo control filter learning program 231 functions as a servo control filter learning process 241. That is, in the servo control filter learning process 241, the servo control filter learning data 232 is loaded from the storage memory 230 into its allocated area in the work memory 240, and various processes are performed based on the servo control filter learning data 232.

The servo control filter learning process 241 corresponds to the processes that are performed in the position calculation processing module 131, the servo control filter calculating module 132, the vibration amount calculating module 133, the vibration amount monitoring module 134, the retry rate monitoring module 135, the filter learning module 136, and the servo control filter table 137, among the process functional modules of the MCU 130 illustrated in FIG. 3.

The servo control filter learning program 231 need not necessarily be stored in advance in the storage memory 230. For example, various programs may be stored in "portable physical medium" connectable to the computer 200 such as a flexible disk (FD), a CD-ROM, a DVD disk, a magneto-optical disk, and an IC card, or "another computer (or server)" connected to the computer 200 through a public line, the Internet, a LAN, and WAN, and the computer 200 may read the programs and execute them.

As set forth hereinabove, according to an embodiment of the invention, a servo control filter can be switched to an optimal servo control filter to suppress the influence of vibration on head positioning control performance such that response to a host side can be prevented from delaying.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information storage device, comprising:
a recording-reproducing head configured to record data on a recording medium and reproduce the data on the recording medium;
a positioning controller configured to position the recording-reproducing head;
a position detector configured to detect a position of the recording-reproducing head based on a servo signal on the recording medium;
a storage module configured to store a plurality of servo control filters; and
a position error detector configured to generate a new position error signal from a target position and the position of the recording-reproducing head detected by the position detector when the positioning controller performs positioning control for the recording-reproducing head with control current obtained by causing a position error signal to pass through each of the servo control filters, wherein,
learning to calculate a vibration amount is sequentially performed with respect to each of the servo control filters for a predetermined time when the positioning controller performs the positioning control upon occurrence of a recording error or a reproducing error, the vibration amount being calculated from the position of the recording-reproducing head detected by the position detector,
the positioning controller is configured to perform the positioning control with one of the servo control filters where the vibration amount is smallest,
the vibration amount calculated with respect to each of the servo control filters is stored in the storage module in association with the servo control filter, and
upon occurrence of the recording error or the reproducing error, among the servo control filters each associated with the vibration amount stored in the storage module, the vibration amount is sequentially calculated with respect to the servo control filters in ascending order of the vibration amount stored in the storage module.

2. The information storage device of claim 1, wherein, when a difference between the vibration amount stored in the storage module in association with each of the servo control filters and a vibration amount calculated upon occurrence of a recording error or a reproducing error is equal to or larger than a predetermined value, the vibration amount stored in the storage module is initialized.

3. The information storage device of claim 1, wherein, when the vibration amount calculated with respect to each of the servo control filters exceeds a predetermined value during a retry performed upon occurrence of a recording error or a reproducing error, the learning is performed.

4. The information storage device of claim 1, wherein, when a retry rate exceeds a predetermined value, the learning is performed.

5. A computer program product embodied on a non-transitory computer-readable medium and comprising code that, when executed, causing a computer to perform:
reading a plurality of servo control filters from a storage module;
sequentially performing learning to calculate a vibration amount with respect to each of the servo control filters for a predetermined time when, upon occurrence of a recording error or a reproducing error, positioning control is performed for a recording-reproducing head with control current obtained by causing a position error signal to pass through the each of the servo control filters, the vibration amount being calculated from the position of the recording-reproducing head
generating a new position error signal from a target position and a position of the recording-reproducing head when the positioning control is performed with one of the servo control filters where the vibration amount is smallest;

storing the vibration amount calculated with respect to each of the servo control filters in the storage module in association with the servo control filter; and upon occurrence of the recording error or the reproducing error, among the servo control filters each associated with the vibration amount stored in the storage module, sequentially calculating the vibration amount with respect to the servo control filters in ascending order of the vibration amount stored in the storage module.

6. A method performed by an information storage device comprising a recording-reproducing head, the method comprising:

reading a plurality of servo control filters from a storage module;

sequentially performing learning to calculate a vibration amount with respect to each of the servo control filters for a predetermined time when, upon occurrence of a recording error or a reproducing error, positioning control is performed for a recording-reproducing head with control current obtained by causing a position error signal to pass through the each of the servo control filters, the vibration amount being calculated from the position of the recording-reproducing head;

generating a new position error signal from a target position and a position of the recording-reproducing head when the positioning control is performed with one of the servo control filters where the vibration amount is smallest;

storing the vibration amount calculated with respect to each of the servo control filters in the storage module in association with the servo control filters; and upon occurrence of the recording error or the reproducing error, among the servo control filters each associated with the vibration amount stored in the storage module, sequentially calculating the vibration amount with respect to the servo control filters in ascending order of the vibration amount stored in the storage module.

7. The method of claim 6, wherein, when a difference between the vibration amount stored in the storage module in association with each of the servo control filters and a vibration amount calculated upon occurrence of a recording error or a reproducing error is equal to or larger than a predetermined value, the vibration amount stored in the storage module is initialized.

8. The method of claim 6, wherein, when the vibration amount calculated with respect to each of the servo control filters exceeds a predetermined value during a retry performed upon occurrence of a recording error or a reproducing error, the learning is performed.

9. The method of claim 6, wherein, when a retry rate exceeds a predetermined value, the learning is performed.

* * * * *